(12) United States Patent
Lapa

(10) Patent No.: US 8,488,129 B2
(45) Date of Patent: Jul. 16, 2013

(54) COMBINED OBJECT CAPTURING SYSTEM AND DISPLAY DEVICE AND ASSOCIATED METHOD

(75) Inventor: Yan N. Lapa, District of Chunsk (RU)

(73) Assignee: Artec Group, Inc., Palo Alto, CA (US)

( * ) Notice: Subject to any disclaimer, the term of this patent is extended or adjusted under 35 U.S.C. 154(b) by 1247 days.

(21) Appl. No.: 11/868,352

(22) Filed: Oct. 5, 2007

(65) Prior Publication Data

US 2009/0091581 A1    Apr. 9, 2009

(51) Int. Cl.
*G01B 11/24* (2006.01)

(52) U.S. Cl.
USPC .......................................................... 356/603

(58) Field of Classification Search
None
See application file for complete search history.

(56) References Cited

U.S. PATENT DOCUMENTS

| | | | |
|---|---|---|---|
| 6,064,759 A * | 5/2000 | Buckley et al. ............... 382/154 |
| 6,252,623 B1 | 6/2001 | Lu et al. |
| 6,341,016 B1 | 1/2002 | Malione |
| 6,493,095 B1 | 12/2002 | Song et al. |
| 7,612,869 B2 * | 11/2009 | Pereira et al. ................. 356/3.13 |
| 7,774,075 B2 * | 8/2010 | Lin ................................. 356/625 |
| 2003/0112447 A1 * | 6/2003 | Harding et al. ............... 356/603 |
| 2004/0105580 A1 | 6/2004 | Hager et al. |
| 2005/0195383 A1 * | 9/2005 | Breed et al. ................... 356/4.01 |
| 2006/0039600 A1 * | 2/2006 | Solem et al. .................. 382/154 |
| 2006/0044546 A1 * | 3/2006 | Lewin et al. .................. 356/4.04 |
| 2006/0103853 A1 * | 5/2006 | Palmateer .................... 356/601 |
| 2006/0132803 A1 * | 6/2006 | Clair et al. .................... 356/614 |
| 2006/0206724 A1 * | 9/2006 | Schaufele et al. ............. 713/186 |
| 2008/0106746 A1 * | 5/2008 | Shpunt et al. ................. 356/610 |
| 2008/0172261 A1 * | 7/2008 | Albertson et al. .............. 705/7 |

OTHER PUBLICATIONS

Form PCT/ISA/210 in connection with International Application No. PCT/US2008/078623; filed Oct. 2, 2008 (Artec Group, Inc. et al.) 3 pgs.
Form PCT/ISA/237 in connection with International Application No. PCT/US2008/078623; filed Oct. 2, 2008 (Artec Group, Inc. et al.) 4 pgs.

* cited by examiner

*Primary Examiner* — Gregory J Toatley
*Assistant Examiner* — Juan D Valentin, II
(74) *Attorney, Agent, or Firm* — Allan Z. Litovsky; Greenberg Traurig, LLP

(57) ABSTRACT

An combined object capturing system and display device and associated method are provided for capturing and measuring an object near a display device. The object capturing system may include at least one projection device for projecting a structured light pattern onto a surface of the object, at least one detection device for capturing at least one image of the structured light pattern acting on the surface of the object, and a computing device for determining a measurement relating to the captured image. The display device may provide a position for the object to assume with respect to the object capturing system. The object capturing system may be combined with, attached to or otherwise positioned alongside the display device. The measurement may be processed constantly and may determine a level of use of the display device, a computer connected to the display device or any device connected to the display device.

18 Claims, 4 Drawing Sheets

COMBINED OBJECT CAPTURING SYSTEM AND DISPLAY DEVICE AND ASSOCIATED METHOD

BACKGROUND OF THE INVENTION

1. Field of the Invention

The disclosure relates to a combined object capturing system and display device and associated method based on a three-dimensional ("3D") measurements and two-dimensional ("2D") measurements of an object near a display device.

2. Background Discussion

There are known devices and methods for performing non-contact measurement of a 3D surface shape of a material object, such as through the use of a structured-light triangulation method. The triangulation method of measuring the surface shape of material objects utilizes the projection of light onto the surface of the object that is, generally, an amplitude-modulated, time-modulated and/or wavelength-modulated ("structured light"). An image of structured light projected onto the surface of an object (hereinafter referred to as "the image") is captured by a camera in a direction different from the direction that the structured light is projected. The image is then analyzed to calculate the shape of the object's surface. A number of parameters impact analysis results, such as parameters of the particular system that forms the structured light and scans the image, the shape of the surface, the distance between the surface of the object and the components of the system, the orientation of the object in relation to the components of the system. Since generally most of the parameters listed are either previously known or easily identified, with the exception of the shape of the object, the distance between the surface of the object and the components of the system, the orientation of the object in relation to the components of the system, it is possible to determine the shape of the object's surface using a triangulation method to analyze the image.

SUMMARY

According to embodiments of the present disclosure, there is provided an object capturing system combined with, integrated with, otherwise attached to or otherwise positioned alongside a display device, comprising: at least one projection device for projecting a structured light pattern onto a surface of an object; at least one detection device, wherein at least one of the detection devices captures at least one image of the structured light pattern acting on the surface of the object; and a computing device for determining a measurement relating to the captured image.

According to embodiments of the present disclosure, there is provided a method for capturing an object near a display device, comprising: projecting at least one structured light pattern from at least one projection device onto a surface of the object; capturing at least one image of the object with at least one detection device, wherein at least one image includes an image of the structured light pattern acting on the surface of the object; and determining a measurement relating to the surface of the object.

According to embodiments of the present disclosure, the display device may provide a position and orientation for the object to assume with respect to the projection and detection devices. The surface of the object may be disposed in a position and an orientation occurring during use of the display device.

According to embodiments of the present disclosure, the measurement relating to the surface of the object may determine a level of use of the display device or a computer connected to the display device or any other device connected to the display device.

According to embodiments of the present disclosure, the measurement relating to the surface of the object may be processed constantly to determine the level of use of the display device or a computer connected to the display device or any other device connected to the display device.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
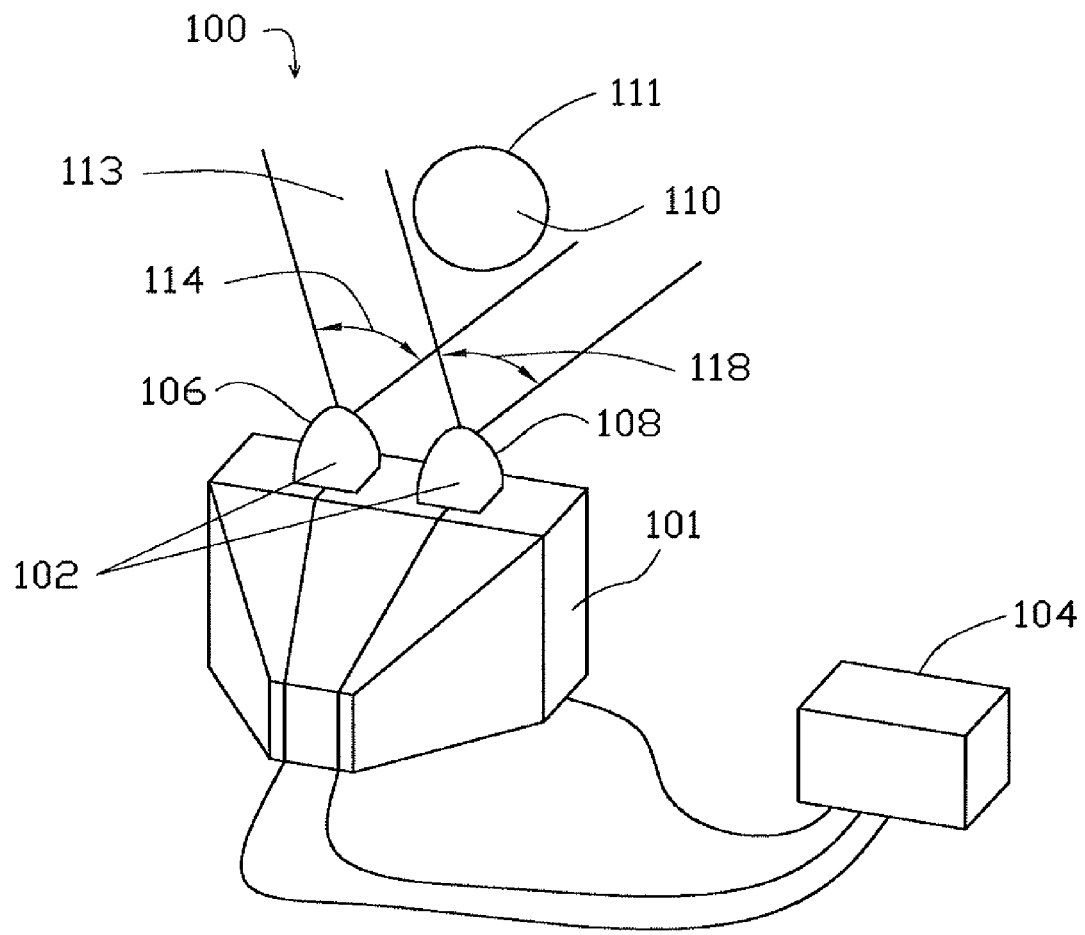
FIG. 1 shows a perspective view of an embodiment of the combined object capturing system and display device for capturing an object near a display device in accordance with one or more embodiments of the present disclosure.

In general, the present disclosure includes the combined object capturing system and display device for capturing images of an object near a display device. Certain embodiments of the present disclosure will now be discussed with reference to the aforementioned figures, wherein like reference numerals refer to like components.

FIG. 1 shows a perspective view of an embodiment of the combined object capturing system and display device 100 for capturing at least one image, scene or video of an object 111 positioned near the integrated object capturing system and display device 100 in accordance with one or more embodiments of the present disclosure. The combined object capturing system and display device 100 may include an object capturing system 102.

In one or more embodiments, the object capturing system 102 is combined with or integrated with a display device 101. While the object capturing system 102 will be referred to herein as being combined or integrated with the display device 101, it is understood that the terms combined and integrated shall also refer to the object capturing system 102 being connected to or otherwise attached to the display device in a fixed or removable relationship or otherwise positioned alongside or adjacent to the display device 101. In one or more embodiments, the object capturing system 102 positioned alongside or adjacent to the display device 101 is an integrated device.

The object capturing system 102 includes at least one projection device 106 that projects structured light 113 about a projection area 114. The structured light 113 may be projected onto a surface 110 of an object 111 near the display device 101.

The object capturing system 102 further includes at least one detection device 108, wherein the at least one of the detection devices 108 captures at least one image of the structured light 113 acting on a surface 110 of the object 111. The detection device 108 may include a field of view 118 that encompasses a portion of the surface 110 of the object 111. It will be described herein that the object capturing system 102 captures images of the object 111, where it is understood that such image capturing may include any number of captured images or a video or scene of the object 111. In one or more embodiments, a computing device 104 is connected to the projection device 106 and the detection device 108 such that the computing device 104 may analyze the images captured by the detection device 108 to perform desired calculations such as, but not limited to, the 3D shape of the surface 110 of the object 111, the distance to the object 111, the orientation of the surface 110 being captured, 2D images of the surface 110 of the object 111, and recognition of the object 111. The computing device 104 may also control the projection device 106 and/or the detection device 108 and the respective components of each.

In one or more embodiments, the computing device 104 may be integrated with the object capturing system 102. In one or more embodiments, the computing device 104 may be separate from the object capturing system 102.

The display device 101 may be any device that displays information to a user or toward the object 111. The display device 101 may include, but is not limited to, a computer monitor, an LCD, a desktop computer, a laptop computer, a television, a portable or mobile telephone, a personal digital assistant, a handheld computing device, a remote terminal, or any other type of display or device that may include a display.

In one or more embodiments, at least one component of the object capturing system 102 may be fixably or removably attached or integrated into the display device 101. For example, the projection device 106 and the detection device 108 of the object capturing unit 102 may each be fixably or removably attached to or integrated into the display device 101. In one or more embodiments, at least one component of the object capturing system 102 may be positioned alongside or adjacent to the display device 101.

In one or more embodiments, the position and/or orientation of the object 111 with respect to the object capturing system 100 may be determined based on the position and orientation of the object 111 with respect to the display device 101. The display device 101 may provide a reference position and/or a reference orientation for the position and orientation of object 111. For example, an object 111 may be positioned adjacent to a display portion or screen of the display device 101 and oriented such that the surface 110 to be analyzed by the object capturing system 102 is directed toward the display portion of the display device 101. In the position and orientation assumed with respect to the display device 101, the object capturing system 102 may analyze the surface 110 of the object 111. In one or more embodiments, the object capturing system 102 may base its calculations on the assumption that the object 111 is disposed at a reference position and/or in the reference orientation.

In one or more embodiments, the computing device 104 may be combined or integrated with the display device 101. In one or more embodiments, the computing device 104 may be separate from the display device 101. In one or more embodiments, the computing device 104 interacts with the display device 101 such that the computing device 104 causes the display device 101 to provide an image. In one or more computing device 104.

The computing device 104 of object capturing system 100 may include a general-purpose computer system which is suitable for implementing the methods for the 3D and 2D measurements of the shape of material objects in accordance with the present disclosure. The computing system 104 is only one example of a suitable computing environment and is not intended to suggest any limitation as to the scope of use or functionality of the invention. In various embodiments, the present system and method for combined object capturing system and display device 100 is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, networked PCs, minicomputers, mainframe computers, distributed computing environments that include any of the above systems or devices, and the like.

In various embodiments, the analysis performed by the computing system 104 by algorithms and methods, which will be discussed in more detail, may be described in the general context of computer-executable instructions, such as program modules being executed by a computer. Generally, program modules include routines, programs, objects, components, data structures, etc. that perform particular tasks or implement particular abstract data types. These algorithms and methods may also be practiced in distributed computing environments where tasks are performed by remote processing devices that are linked through a communications network. In a distributed computing environment, program modules may be located in both local and remote computer storage media including memory storage devices. In one or more embodiments, the computing system 104 may analyze the image captured by the detection device 108 by executing one or more computer programs. The computer programs may be stored in a memory medium or storage medium such as a memory and/or ROM, or they may be provided to a CPU through a network connection or other I/O connection.

While a computer or a computing device will be referred to herein as being connected to or associated with the display device 101, it is understood that the terms computer and computing device shall also refer to the computing system 104 or otherwise to another device connected to or associated with the display device 101.

The object 111 may be any material object capable of being captured with the object capturing system 102, including, but not limited to, a face of a user of the display device 101, a body part (e.g., a hand, palm, fingerprint, etc.) of a user of the display device 101, an capturing badge, and any other object that can be identified by the combined object capturing system and display device 100. In one or more embodiments, where the object 111 is associated with a user of the display device 101, the reference position and/or the reference orientation provided by the display device 101 may correspond to a position and/or an orientation associated with the use of the display device 101. For example, where the object 111 is a face of a user of the display device 101, the reference position and/or the reference orientation provided by the display device 101 may be the position and/or the orientation at which the user would maintain its face during operation of the display device 101.

In one or more embodiments, the object 111 may be captured by the object capturing system 102 and then the captured images may be used for identification purposes based upon historical operation of the combined object capturing system and display device 100. The historical operation may include a setup phase of the object capturing system 102, wherein the projection device 106 projects the structured light 113 on the object 111, the detection devices 108 captures images of the surface 110 of the object 111, and the computing device 104 analyzes the captured image. A measurement based on a result of the historical operation of the object 111 may be recorded. In a subsequent operation of the object capturing system 102, a measurement of the subsequent operation generated by the computing system 104 may be compared to the measurement of the historical operation. If the measurement of subsequent operation corresponds to the measurement of the historical operation, then the object 111 is identified as the historical object; otherwise, the object 111 is identified as an object other than the historical object.

In one or more embodiments, the measurement results used in the setup phase may be obtained from an external source and input into the combined object capturing system and display device 100.

In at least one embodiment, the object capturing system 102 may be capable of interfacing with the display device 101 such that a measurement made during an operation of the combined object capturing system and display device 100 may cause the display device 101 to perform a function of the display device 101. In at least one embodiment, the object capturing system 102 may be capable of interfacing with the display device 101 such that a level of access to the display device 101 or the computing device 104 or another device connected to the display device 101 or computing device 104 may be provided based upon a measurement made during an operation of the object capturing system 102. Where an object 111 may be identified as a historical object, the object 111 may be granted a level of access to the display device 101 or another device, wherein the level of access is associated with the historical object. For example, the level of access associated with the historical object may be determined during a setup phase of the object capturing system 102. For example, the face of a user could be analyzed such that a user would be provided with secure access to the computing system 104 and/or use of the display device 101 through recognition of certain characteristics of the user captured by the object capturing system 102.

In at least one embodiment, the level of access to the display device 101 may determine at least one of: an image that may be displayed on the display device 101; access to or use of a function that the user may execute on the display device 101 or the computing device 104 or any other device connected to the display device 101 or the computing device 104; and a function that may be automatically displayed by the display device 101 or executed by the computing device 104. In at least one embodiment, the user may not execute certain functions of the display device 101 or the computing device 104 if the object 111 is not identified as the historical object associated with a level of access necessary to execute such functions.

In one or more embodiments, the measurements described herein may be processed constantly.

Figure 2:
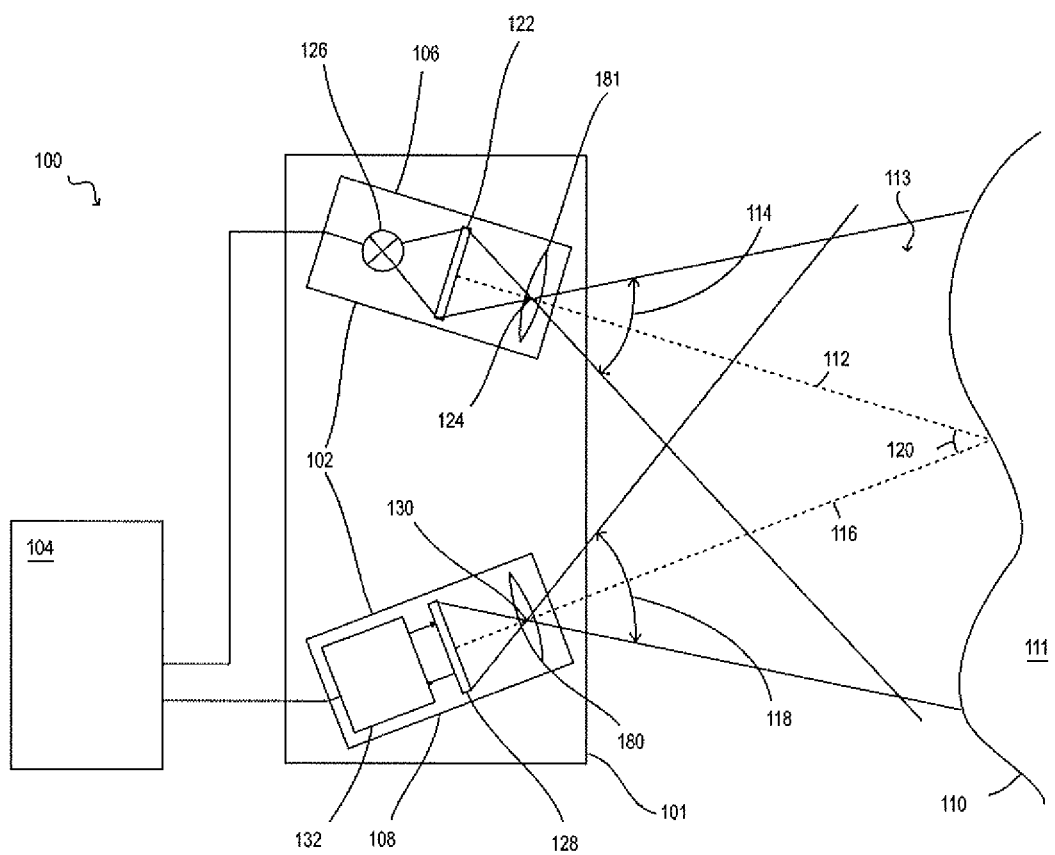
FIG. 2 shows a block diagram of the combined object capturing system and display device for capturing an object near a display device in accordance with one or more embodiments of the present disclosure.

FIG. 2 shows a block diagram of the combined object capturing system and display device 100 for capturing an object 111 near the display device 101 in accordance with one or more embodiments of the present disclosure. The combined object capturing system and display device 100 may include at least one projection device 106 and at least one detection device 108. In at least one embodiment, the projection device 106 is a slide projector including a light source 126 and a light modulating device 122 for modulating the light emitted from the light source 126. The light modulating device 122 may be a slide-type including a slide, a liquid crystal display (LCD)-type including a liquid crystal screen, or other device for creating a structured light 113. In at least one embodiment, the projection device 106 may include a lens 181 having a vertex 124 for projecting a slide image as structured light 113 about a projection area 114 onto a surface 110 of an object 111 near the display device 101. In accordance with this and other embodiments, the structured light 113 can also be generated using other methods, such as interferential, moir and diffractive light generation methods.

In at least one embodiment, the projection device 106 projects the structured light 113 in a wavelength selected from one of optical, visible and infrared wavelengths. In at least one embodiment, the projection device 106 is a continuous light source. In at least one embodiment, the projection device 106 is incorporated in the display device 101 itself, wherein the display device 101 projects the structured light 113.

In at least one embodiment, the detection device 108 may include a photographic lens 180 having a vertex 130, a matrix radiation receiver 128 and a driver 132. The photographic lens 180 forms an image on the surface of the matrix radiation receiver 128. The driver 132 functions as an electronic signal management and processing unit which controls operation of the matrix radiation receiver 128 and may convert the image captured by the matrix radiation receiver 128 to another format (e.g., VGA, bmp, jpeg, etc.) as desired or required before the captured image is transferred to a computing device 104. The detection device 108 may include a field of view 118 that encompasses a portion of the surface 110 of the object 111. The projection device 106 may include a projector axis 112, and the detection device 108 may include a detector axis 116, such that a triangulation angle 120 is the angle between the projector axis 112 and the detector axis 116.

Figure 3:
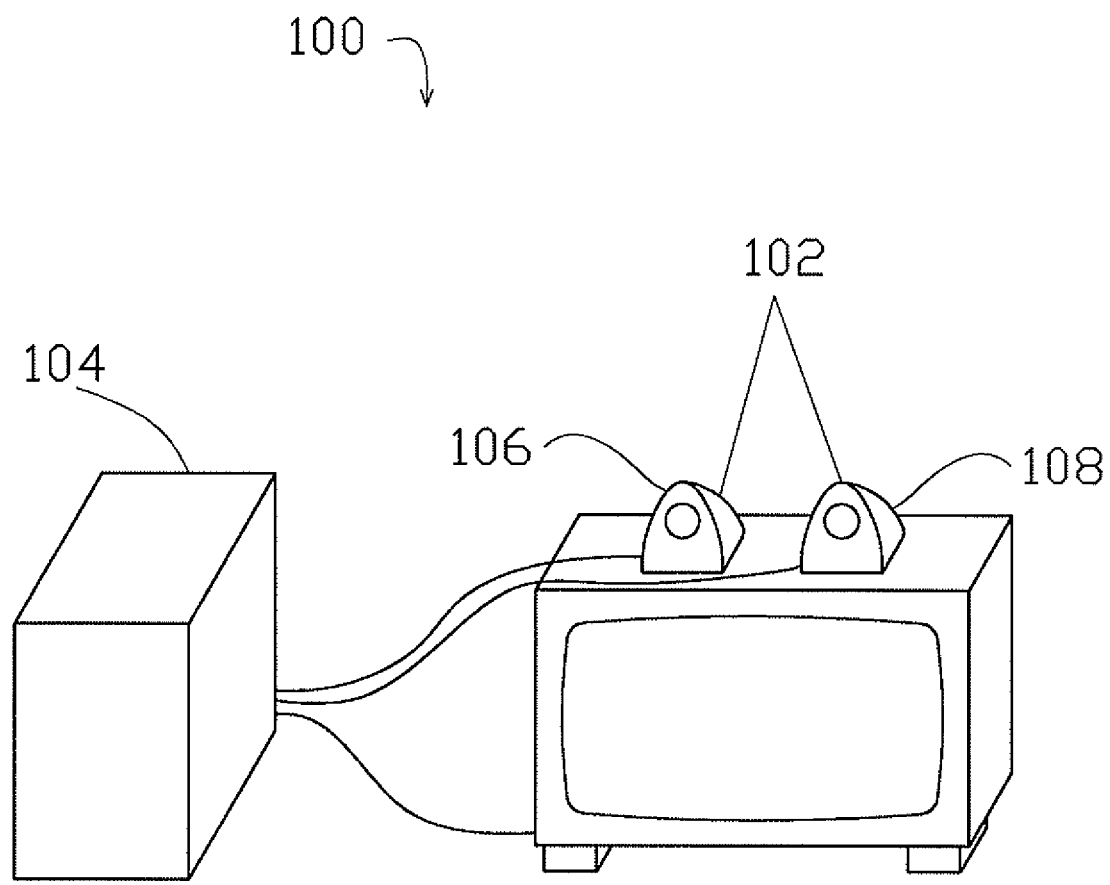
FIG. 3 shows an embodiment of the combined object capturing system and display device including a desktop computer in accordance with one or more embodiments of the present disclosure.

In accordance with one or more embodiments as shown in FIG. 3, the combined object capturing system and display device 100 may include a display device 101 that comprises a display or monitor for a desktop computer 104.

Figure 4:
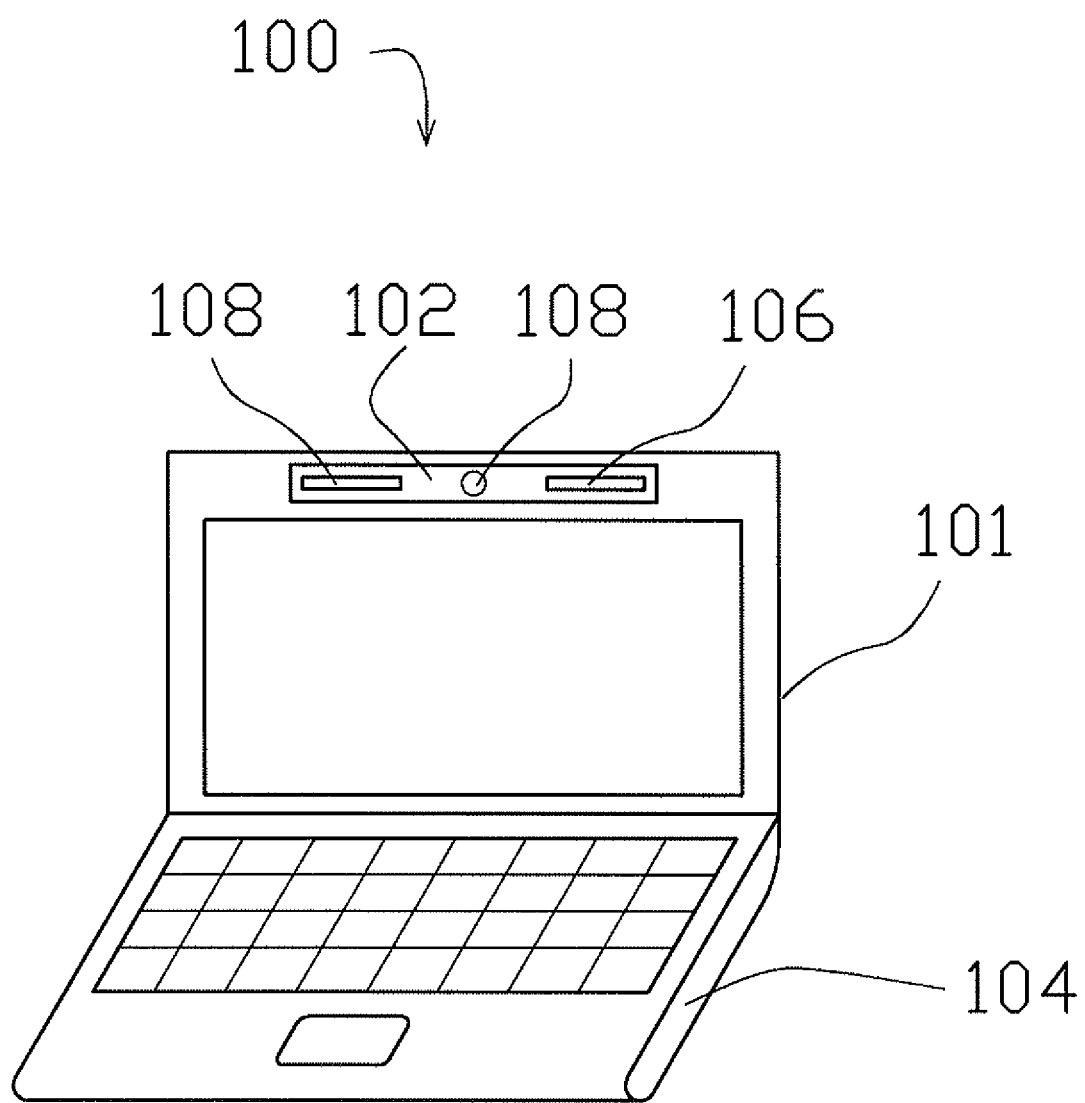
FIG. 4 shows an embodiment of the combined object capturing system and display device including a laptop computer in accordance with one or more embodiments of the present disclosure.

FIG. 4 shows an embodiment of the combined object capturing system and display device 100 in which the display device 101 is a component of a laptop computer 104 in accordance with one or more embodiments of the present disclosure.

While the apparatus and method have been described in terms of what are presently considered to be the most practical embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A system for the 3D measurement of the shape of a material object, comprising:
   a display device; and
   at least one projection device for projecting a structured light pattern onto a surface of an object;
   at least one detection device for capturing at least one image of the surface of said object, wherein at least one of the detection devices captures at least one image of the structured light pattern acting on the surface of said object;

a computing device for determining a measurement relating to the captured image;

wherein said display device provides a position and orientation for said object to take with respect to said at least one detection device prior to capturing the at least one image.

2. The system of claim 1, wherein at least one projection device and at least one detection device are integrated with said display device.

3. The system of claim 1, wherein at least one projection device and at least one detection device are separated from said display device.

4. The system of claim 1, wherein said display device is a computer display.

5. The system of claim 1, wherein said object is a face of a user of said display device.

6. The system of claim 1, wherein the measurement determines a level of access of a computer connected to said display device.

7. The system of claim 1, wherein said computing device compares the measurement to at least one historical measurement.

8. The system of claim 7, wherein the historical measurement is associated with a predetermined level of access of a computer connected to said system.

9. The system of claim 8, wherein the measurement is processed periodically to determine the level of access of the computer connected to said system.

10. A method for the 3D measurement of the shape of an object positioned near a display device, comprising:

projecting a structured light pattern from at least one projection device onto a surface of the object positioned near a display device;

capturing at least one image of the surface of said object with at least one detection device, where at least one of the captured images includes an image of the structured light pattern acting on the surface of said object, wherein said display device provides a position and orientation for said object to take with respect to the at least one detection device prior to capturing the at least one image; and determining a measurement relating to the surface of said object.

11. The method of claim 10 wherein at least one projection device and at least one detection device are integrated with said display device.

12. The method of claim 10, wherein at least one projection device and at least one detection device are separated from said display device.

13. The method of claim 10, wherein said display device is a computer display.

14. The method of claim 10, further comprising positioning said at least one projection device and said at least one detection device to act on an object situated for use of said display device.

15. The method of claim 14, further comprising providing a level of use access of a computer based upon the measurement.

16. The method of claim 15, wherein providing a level of access of a computer further comprises:

comparing the measurement to at least one historical measurement;

if said measurement corresponds to said historical measurement, allowing use of said computer; and denying use of said computer if said measurement fails to correspond to said historical measurement.

17. The method of claim 16, wherein said historical measurement is associated with a predetermined level of access of a computer.

18. The method of claim 17, further comprising processing said measurement periodically to determine the level of access of said computer.

* * * * *